United States Patent Office 3,282,903
Patented Nov. 1, 1966

---

3,282,903
PROCESS AND PRODUCTS OF MODIFIED COPOLYMERS OF ETHYLENE AND PROPADIENE
Stanley Tocker, Wilmington, Del., assignor to E. I. du Pont de Nemours and Company, Wilmington, Del., a corporation of Delaware
No Drawing. Filed May 24, 1965, Ser. No. 458,371
7 Claims. (Cl. 260—79.5)

This application is a continuation-in-part of my co-pending application Serial No. 148,049 filed October 27, 1961, now abandoned, and which in turn is a continuation-in-part of my application Serial No. 800,665 filed March 20, 1959, and now abandoned.

This invention relates to the manufacture of thermoplastic polymeric films. More particularly, it relates to the preparation of polyhydrocarbon films suitable for conversion to bags, containers and similar packages.

The invention will be described primarily as it applies to polyethylene films. However, it will be clear that the invention is equally applicable to shaped structures of all types composed of polymers of alpha-olefins in general. Thus, filaments, foils, rods, tubes, as well as self-supporting films, are embraced by the present invention. The statements regarding prior polyethylene products and the utility of the present invention are equally applicable to polymers of propylene, butylene, styrene, pentene-1, hexene-1, heptene-1, octene-1, decene-1, 3-methyl butene-1, 4-methyl pentene-1, 4-4-dimethyl pentene-1 and isobutylene, etc., as well as polymers of ethylene.

Polyethylene, in the form of a self-supporting film, displays many properties which make it particularly desirable as a packaging film. The polyethylene film is characterized by high impact strength, high tenacity, high elongation combined with chemical inertness and low permeability to water vapor. However, polyethylene films lack some requisites for some important applications. The most outstanding is its lack of adherability. Thus, printing, a necessary treatment for successful use of packaging materials, is performed with great difficulty due to the lack of adherability of printing inks to the film's surface. Coatings and laminates, useful for special purposes such as improving heat-sealability, etc., are difficult to apply because of the film's lack of adherability to itself and other materials. Another property lacking in these polymers in the form of films is stiffness. The limpness apparent in many polyhydrocarbon films, particularly polyethylene film, militates against their use in conventional bag-making and bag-processing machines. Still another property that can be improved is the polymer's stability to light.

One object of the present invention is a process for remedying the above-described situation, i.e., a process for improving the above properties without affecting adversely the desirable properties of the polymer. Another object is to form novel polymeric compositions that display improved properties, particularly improved adherability to itself and other materials, increased stiffness and/or increased stability to light. Other objects will appear hereinafter.

The objects are accomplished by a polymeric composition comprising a modified copolymer of 65–99 mole percent, preferably 90–97 mole percent, of an alpha-olefin, such as ethylene, which provides in said copolymer a recurring group having the structure:

wherein R is hydrogen or alkyl or 1–8 carbon atoms; and 1–35 mole percent, preferably 3–10 mole percent, of propadiene, said copolymer having been modified by reaction with a thiol compound selected from the group consisting of hydrogen sulfide, ethanethiol, 1-propanethiol, 2-propanethiol, 1-hexanethiol, 1 - decanethiol, benzenethiol, thiosalicylic acid and mercaptobenzothiazole, which provides in said copolymer a resulting 1–35 mole percent of one or more groups, in a random selection of each, from the group consisting of:

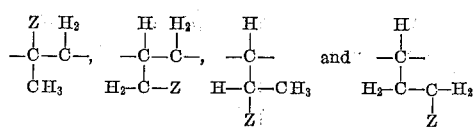

where Z is selected from the group consisting of thioalkyl, thioaryl and thioaryl carboxylic acid radicals.

The process involves first copolymerizing 65–99 mole percent of the alpha-olefin with 35–1 mole percent of propadiene by subjecting the monomers, preferably in a liquid hydrocarbon or halogenated hydrocarbon such as hexane, benzene, toluene, tetrachloroethylene, bromobenzene, chlorobenzene, etc., to a temperature of −40° to 300° C. and a pressure of 1–1000 atomspheres in the presence of a "coordination catalyst"; isolating the resulting polymer; and, thereafter, reacting the polymer with a thiol compound as described above.

A "coordination catalyst" may be defined in its broadest sense as one formed by the reaction of a reducible polyvalent metal compound with an amount of a reducing agent sufficient to reduce the valence of the metal component. Specifically, the catalyst is composed of:

(A) a compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O— hydrocarbon; and (B) a reducing compound selected from the group consisting of metal hydrides and compounds having a metal of Groups I, II and III of the Periodic Table, said metal being above hydrogen in the electromotive series of the metals, attached directly through a single bond to a carbon atom, said carbon atom selected from the group consisting of trigonal carbon and tetrahedral carbon.

In the above definitions, Periodic Table means Mendeleeff's Periodic Table of the Elements, 25th ed., Handbook of Chemistry and Physics, published by the Chemical Rubber Publishing Co.

Ordinarily, catalytic amounts of the components of the catalyst system may be used in the first step of the process. Thus, component (A) may comprise 0.01–20 millimoles or higher, preferably 0.2–20 millimoles, per liter of solvent plus monomers. The mole ratio of component (B) to component (A) in the catalyst system should be at least 1:1, preferably 1:1 to 100:1

Component (A) in the catalyst system has been defined as a compound containing at least one metal selected from the group consisting of metals of Groups IVa, Va and VIa of the Periodic Table, iron, cobalt, copper, nickel and manganese, having directly attached to it a halogen atom, oxygen atom, hydrocarbon or —O— hydrocarbon group. Typical Group IVa metals are titanium, zirconium and hafnium; Group Va metals, vanadium, columbium and tantalum; Group VIa metals, chromium, molybdenum and tungsten. Specific examples of the compounds included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate, and the like.

Component (B) in the catalyst system has been defined as a reducing compound selected from the group consisting of metal hydrides and compounds having a metal of Groups I, II and III of the Periodic Table above hydrogen in the electromotive series, attached directly through a single bond to a trigonal or tetrahedral carbon atom. A trigonal carbon atom is a carbon atom having two single bonds and a double bond;

Groups which may be attached to a metal, which metal is attached to a trigonal carbon atom, are aryl groups or arylalkyl groups. By tetrahedral carbon atom is meant a carbon atom having four single bonds;

Groups which may be attached to a metal, which metal is attached to a tetrahedral carbon atom, are alkyl groups, aryl groups, alkylaryl groups and alkenyl groups. Specific examples of useful reducing agents included in this definition are phenyl magnesium bromide, lithium aluminum tetraalkyl, aluminum trialkyl, dimethyl cadmium, diphenyl tin, and the like.

Useful combinations of component (A) and component (B) compounds for use as catalyst systems in the invention include the following:

Vanadyl dichloride ($VOCl_2$) plus aluminum diisobutyl butoxide
Vanadyl trichloride ($VOCl_3$) plus aluminum triisobutyl
Vanadyl trichloride ($VOCl_3$) plus aluminum hydride ($AlH_3$)
Vanadyl trichloride ($VOCl_3$) plus lithium butyl
Vanadium dichloride ($VCl_2$) plus aluminum triisobutyl
Vanadium trichloride ($VCl_3$) plus aluminum isobutyl dichloride
Vanadium tetrachloride ($VCl_4$) plus aluminum isobutyl dibutoxide
Vanadium tetrachloride ($VCl_4$) plus aluminum triisobutyl
Vanadium tetrachloride ($VCl_4$) plus aluminum hydride ($AlH_3$)
2-ethyl hexyl vanadate plus aluminum triisobutyl
Titanyl dichloride ($TiOCl_2$) plus aluminum isobutyl dichloride
Titanium tetrachloride ($TiSl_4$) plus ethyl magnesium bromide
Titanium tetrachloride ($TiCl_4$) plus aluminum triisobutyl
Titanium tetrachloride ($TiCl_4$) plus lithium aluminum tetraisobutyl
Titanium tetrachloride ($TiCl_4$) plus sodium naphthalene
Tetraisopropyl titanate $Ti(OC_3H_7)_4$ plus aluminum triisobutyl
Tetraisobutyl titanate $Ti(OC_4H_9)_4$ plus sodium naphthalene
Cobaltous chloride ($CoCl_2$) plus aluminum triisobutyl
Cobalt hexammonium chloride $Co(NH_3)_6Cl_2$ plus aluminum triisobutyl
Manganese bromide ($MnBr_2$) plus aluminum triisobutyl
Manganese bromide ($MnBr_2$) plus zinc diisobutyl
Chromium chloride ($CrCl_3$) plus aluminum triisobutyl
Cuprous chloride ($Cu_2Cl_2$) plus aluminum triisobutyl
Ferric bromide ($FeBr_3$) plus aluminum triisobutyl
Molybdenum chloride ($MoCl_5$) plus aluminum triisobutyl
Nickel chloride ($NiCl_2$) plus aluminum triisobutyl Polymerization is preferably carried out in a solvent medium. Among the solvents which have been found useful in this step are hydrocarbons and halogenated hydrocarbons: hexane, benzene, toluene, cyclohexane, bromobenzene, chlorobenzene, o-dichlorobenzene, tetrachloroethylene, dichromoethane and 1,1,2,2-tetrahloroethane. Heterocyclic compounds such as tetrahydrofuran, thiophene and dioxane may also be used.

The reaction conditions, temperature and pressure, at which polymerization is performed may be extremely mild. Temperatures of the reaction may range from −40° to 300° C. and pressures of 1 atmosphere to 1000 atmospheres may be used successfully. The optimum conditions of temperature and pressure are 0°–300° C. and not more than 500 atmospheres respectively.

As an illustration of a method contemplated for carrying out the present invention, the catalyst system, e.g., vanadyl trichloride and aluminum triisobutyl, is mixed in the hydrocarbon solvent, e.g., n-hexane, under a blanket of nitrogen gas. Component (A), vanadyl trichloride may be present to the extent of about 5 millimoles and component (B), aluminum tiisobutyl, may be present to the extent of about 10 millimoles. After stirring for about ten minutes at a temperature of about 25° C., the nitrogen supply is cut off and the gas stream composed of ethylene and/or other hydrocarbon monomer or monomers having terminal ethylenic unsaturation with propadiene in the desired mole ratio is passed into the catalyst suspension. Alternatively, the monomers may be introduced first into the reaction vessel, followed by introduction of the catalyst. The order of adding catalyst and monomers is not critical to the present invention. After sufficient polymer is built up, the gas flow is stopped and water, methanol, ethanol or a similar low molecular weight alcohol, is added to destroy the catalyst. The copolymer or terpolymer, (depending on the number of monomers used) is then isolated and purified in a manner known to those skilled in the art.

The mole ratio of propadiene-to-ethylene and/or other hydrocarbon monomer reacted should be such that the product of this step is composed of 1–35 mole percent propadiene (preferably 3–10 mole percent) and 99–65 mole percent (preferably 97–90 mole percent) of the other hydrocarbon monomer or monomers. It has been found that the reaction is very efficient so that a reaction mixture of about 1–35 mole percent propadiene and about 99–65 mole percent of the remaining monomer or monomers usually will provide the desired product.

The product of this step is a substantially linear polymer having pendant vinyl and methylene groups and having an inherent viscosity of at least 0.3. The different pendant groups will result from the fact that propadiene will copolymerize with monomers by more than one mechanism. Thus, propadiene will appear in a carbon-to-carbon chain with a pendant methylene group:

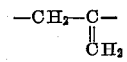

or it will appear in the carbon-to-carbon chain with a pendant vinyl group:

or any combinations of these. Most copolymers will contain some of each of the above types of structure, i.e., copolymers with propadiene will usually have some pendant methylene groups and some pendant vinyl groups. The present invention also contemplates copolymers with propadiene in the form of block copolymers, random copolymers or combinations of block and random. The determination of pendant vinyl groups and pendant methylene groups can be accomplished by Infrared Spectral Techniques known to those skilled in the art, including those described by W. M. D. Bryant and R. C. Voter in "Journal of American Cemical Society," 75, 6113 (1953), and F. W. Billmeyer in "Textbook of Polymer Chemistry," Chapter 7, Interscience Publishers (1957).

In the modifying step, the polymer composed of 1–35 mole percent propadiene is reacted with the thiol compound. The polymer can be in the form of a particulate mass or a fiber or a film. Reaction can be carried to any degree. Preferably, the polymer is shaped into a structure in ways well known to those skilled in the art prior to reaction. Thus, the polymer can be melt pressed at a temperature of about 150° C. or higher to form a film. The reaction can be effected with the entire polymeric structure or reaction can be limited to the surface of the structure.

Preferred thiol compounds are 1 - propanethiol and thiosalicylic acid. The reaction with the ethylene/propadiene copolymer is carried out in the presence of a free radical or cationic initiator and in an appropriate solvent, such as bromobenzene or chlorobenzene. The mixture is heated for a sufficient time to complete the reaction in a temperature range of 100°–150° C., after which the product is isolated, purified by washing or extracting with a solvent such as acetone, dried and, thereafter, pressed into a film for examination.

The time required for contacting the copolymer with the thiol compound depends on a number of factors such as temperature, composition of copolymer, and the specific result desired. Thus, in effecting treatment with the thiol compound to increase adherability of film surfaces, the time required for reaction is determined by carrying out the reaction and testing film surface adherence to itself or to other materials which may be adhered to it after different time periods. Higher temperatures, higher concentrations of the thiol compound and higher percentages of propadiene in the copolymer tend to reduce the time necessary for reaction. After reaction is complete, the product is separated from the mixture, washed with water and dried.

The utility of polymers containing thioether groups from reaction with thiols display improved stability to heat. Those containing thiosalicylic acid groups from reaction with mercapto-containing aromatic acids display improved stability to heat and light.

It has been found that since the chemical transformations occur on unsaturated groups appended to the polymer chain, while the chain itself is essentially unaffected, the desired characteristics of the parent polymer are retained in the final product. Thus, the final product displays satisfactory tensile strength, impact strength, flex resistance, etc., while the property improved such as its adherence to printing inks, coatings, other films such as regenerated cellulose and polyethylene terephthalate, is increased substantially. Furthermore, it has been found that the adherability achieved shows no tendency to disappear upon aging.

The following examples are intended to provide a clearer understanding of the present invention. They should not be considered to limit the scope of the invention.

*Example 1*

To 250 ml. of well agitated anhydrous tetrachloroethylene containing 0.5 ml. of vanadyl trichloride and 15 ml. of 1 molar aluminum triisobutyl in cyclohexane there was introduced at a temperature of 95–100° C., a 20:1 mole ratio of ethylene/propadiene gas stream at a rate of approximately 160 ml./minute. The reaction was allowed to proceed for one hour and 15 minutes. The gas flow was then stopped; the catalyst was destroyed by mixing in 50 ml. of methanol; and the copolymer was isolated and purified by filtering the washing in a Waring blendor, using successively 100 ml. of 5% concentrated hydrochloric acid in isopropanol, two 150 ml. portions of 25% methanol in distilled water and 100 ml. of methanol.

In a glass tube were added 25 grams of the 20:1 mole ratio ethylene/propadiene copolymer, prepared above, 0.6 g. of azobisisobutyronitrile, 150 ml. of bromobenzene and 10 ml. of 1-propanethiol. The tube was purged with nitrogen, sealed and heated at 150° C. for 5 hours. The isolated polymeric product showed no residual unsaturation on infrared analysis, indicating that all of the appended unsaturated groups of the copolymer had been converted to thioether groups. Elemental analysis showed that the polymer contained 4.8% sulfur, corresponding closely to the theoretical amount for one propanethiol group per double bond. The polymer was formed into a film by pressing a sample at 150° C. using a force of 30 tons per square inch.

The resulting film was tougher than one pressed from the unmodified copolymer. On heating at 100° C. for 72 hours this film lost only about 25% of its elongation value whereas a film from linear polyethylene lost about 80% of its elongation when submitted to similar heating. A control polyethylene film (not copolymerized with propadiene) similarly treated with 1-propanethiol showed no such improvement in thermal stability.

*Example 2*

To 250 ml. of well agitated anhydrous tetrachloroethylene containing 0.5 ml. of vanadyl trichloride and 15 ml. of 1 molar aluminum triisobutyl in cyclohexane, there was introduced at a temperature of 95°–100° C., a 20:1 mole ratio of ethylene/propadiene gas stream at a rate of approximately 160 ml./minute. The reaction was allowed to proceed for 1 hour and 15 minutes. The gas flow was then stopped; the catalyst was destroyed by mixing in 50 ml. of methanol; and the copolymer was isolated and purified by filtering and washing in a Waring blendor, using successively 100 ml. of 5% concentrated hydrochloric acid in isopropanol, two 150 ml. portions of 25% methanol in distilled water and 100 ml. of methanol.

One gram of the 20:1 mole ratio ethylene/propadiene copolymer in particulate form, prepared as above was placed in a glass tube. To this were added 5 ml. of bromobenzene, 5 ml. of benzenethiol and 0.2 gram of azobisisobutyronitrile. The tube was purged with nitrogen, sealed and heated at 125°–130° for 9 hours. The product was washed with copious amounts of methanol in an Osterizer, dried in a vacuum oven at 60° C. and was pressed into a film at 150° C. using a force of 30 tons on a one-square inch sample. The polymer showed a 75% decrease in unsaturation absorption and the presence of mono-substituted benzene bands at 685, 1025, 1085 and 1590 cm.$^{-1}$ upon infrared analysis. Elemental analysis showed the presence of 3.3% sulfur in the copolymer. Partial extraction of this product with toluene in a Soxhlet extraction apparatus showed no composition change indicating that benzenethiol was chemically bonded to the polymer.

The film was tested for thermal stability in air in the manner given in Example 1 and showed a two-fold improvement over a similarly benzenethiol-treated polyethylene film control.

*Example 3*

In a glass tube there was introduced under nitrogen 0.5 g. of alpha, alpha'-azocyclohexane carbonitrile in 50 ml. of chlorobenzene, 10.0 g. of thiosalicylic acid, and 10.0 g. of the 20:1 mole ratio ethylene/propadiene copolymer having been prepared as in Example 1. The reaction mixture was sealed in the tube under nitrogen and then heated for 12 hours at 100° C. The tube was opened and the reaction product was purified by washing with hot acetone in an Osterizer and drying in a vacuum oven. Infrared analysis showed strong absorption at 1700 cm.$^{-1}$ characteristic of an ester group, and bands at 1600 cm.$^{-1}$, 1000–1200 cm.$^{-1}$ and 750 cm.$^{-1}$ characteristic of an aromatic compound. Approximately 20% of the side chain double bonds were eliminated by reaction with the thiosalicylic acid. Elemental analysis showed the presence of approximately 1% sulfur. The inherent viscosity of the polymer was not decreased through this post-reaction.

A film made from this product was flexible after 200 hours exposure to an ultraviolet sunlamp; a film of ethylene treated similarly with thiosalicylic acid cracked in 25 hours.

The invention claimed is:

1. A modified copolymer of 65–99 mole percent of ethylene and 1–35 mole percent of propadiene, said modification being by reaction with a thiol compound selected from the group consisting of hydrogen sulfide, ethanethiol, 1-propanethiol, 2-propanethiol, 1-hexanethiol, 1-decanethiol, benzenethiol, thiosalicylic acid and mercaptobenzothiazole, to provide 1–35 mole percent of a random selection of recurring units selected from the group consisting of

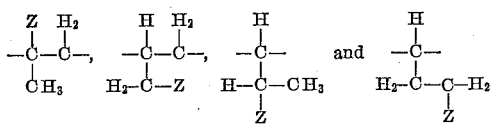

where Z is selected from the group consisting of thioalkyl, thioaryl and thioaryl carboxylic acid radicals.

2. The substantially linear polymer of claim 1 in the form of a shaped structure.
3. The substantially linear polymer of claim 1 in the form of a self-supporting film.
4. The substantially linear polymer of claim 1 wherein Z is thioalkyl.
5. The substantially linear polymer of claim 1 wherein Z is thioaryl.
6. The substantially linear polymer of claim 1 wherein Z is a thioaryl carboxylic acid radical.
7. A process for preparing polymer compositions which comprises reacting a copolymer of 1–35 mole percent propadiene and 65–99 mole percent of ethylene, said copolymer having pendant methylene and vinyl groups as indicated by infrared absorption bands at wavelengths of 888 cm.$^{-1}$ and 993 cm.$^{-1}$, respectively, with a thiol compound selected from the group consisting of hydrogen sulfide, ethanethiol, 1-propanethiol, 2-propanethiol, 1-hexanethiol, 1-decanethiol, benzenethiol, thiosalicylic acid and mercaptobenzothiazole, at a temperature of 100°–150° C., for a time sufficient to react said thiol compound by addition to the double bond of said pendant methylene and vinyl groups.

References Cited by the Examiner
UNITED STATES PATENTS 3,041,304   6/1962   Gardner _____ 260—79.5
3,151,104   9/1964   Robinson _____ 260—79.5

FOREIGN PATENTS 776,326   6/1957   Great Britain.

OTHER REFERENCES

"British Compounding Ingredients for Rubber," 1957, TS 1890 W 58, Heffer & Sons (page 5 relied on).
"Synthetic Rubber From Alcohol," Talalay, 1945, TS 1925 T3; Interscience Publishers (page 240 relied on).
Whitby, "Synthetic Rubber," 1954, TS 1925 W 45, John Wiley (page 298 relied on).

JOSEPH L. SCHOFER, *Primary Examiner.*

F. L. DENSON, *Assistant Examiner.*